United States Patent
Di Cairano-Gilfedder et al.

(10) Patent No.: US 11,171,855 B2
(45) Date of Patent: Nov. 9, 2021

(54) TELECOMMUNICATIONS NETWORK

(71) Applicant: British Telecommunications Public Limited Company, London (GB)

(72) Inventors: Carla Di Cairano-Gilfedder, London (GB); Gilbert Owusu, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 16/494,179

(22) PCT Filed: Feb. 9, 2018

(86) PCT No.: PCT/EP2018/053348
§ 371 (c)(1),
(2) Date: Sep. 13, 2019

(87) PCT Pub. No.: WO2018/166726
PCT Pub. Date: Sep. 20, 2018

(65) Prior Publication Data
US 2020/0092189 A1 Mar. 19, 2020

(30) Foreign Application Priority Data
Mar. 13, 2017 (EP) ..................................... 17160488

(51) Int. Cl.
*H04L 12/26* (2006.01)
*H04L 12/24* (2006.01)

(52) U.S. Cl.
CPC ........ *H04L 43/0882* (2013.01); *H04L 41/142* (2013.01); *H04L 41/145* (2013.01); *H04L 41/5019* (2013.01); *H04L 43/0894* (2013.01)

(58) Field of Classification Search
CPC . H04L 43/0882; H04L 41/142; H04L 41/145; H04L 41/5019; H04L 43/0894; H04L 41/14; H04L 41/147
See application file for complete search history.

(56) References Cited

U.S. PATENT DOCUMENTS 6,304,909 B1 10/2001 Mullaly et al.
7,143,283 B1 11/2006 Chen
(Continued)

FOREIGN PATENT DOCUMENTS

| EP | 0926919 | 6/1999 |
| WO | WO-2006/067769 | 6/2006 |

(Continued)

OTHER PUBLICATIONS

International Search Report for corresponding International Application No. PCT/EP2015/079250 dated Feb. 12, 2016; 4 pages.
(Continued)

*Primary Examiner* — Walter J Divito
(74) *Attorney, Agent, or Firm* — Patterson Thuente Pedersen, P.A.

(57) ABSTRACT

A method of dimensioning a link in a telecommunications network, and a device for implementing the method, the method including determining, for a first plurality of sets of traffic observations, wherein each set of the first plurality of sets includes a series of traffic observations each indicating the amount of traffic on a link within an observation interval of a particular duration for that set, a peak value of a traffic observation of the series of traffic observations within each set of the first plurality of sets and an average value of the series of traffic observations within each set of the first plurality of sets; calculating a first peak to average ratio for each observation interval duration based on the determined peak and average values within each set of the first plurality of sets; determining a goodness of fit value for a power function of the first peak to average ratio against its respective observation interval duration; selecting a dimensioning interval duration based on the determined goodness of fit value; and estimating a capacity of the link based on the selected dimensioning interval duration.

10 Claims, 6 Drawing Sheets

(56) References Cited

U.S. PATENT DOCUMENTS

| | | |
|---|---|---|
| 2004/0148383 A1 | 7/2004 | Gonsalves et al. |
| 2004/0215806 A1 | 10/2004 | Brenner et al. |
| 2005/0135804 A1 | 6/2005 | Rashid |
| 2008/0080396 A1 | 4/2008 | Meijer et al. |
| 2008/0123533 A1 | 5/2008 | Zhang |
| 2008/0181125 A1 | 7/2008 | Imai |
| 2010/0172251 A1 | 7/2010 | Adam et al. |
| 2011/0153507 A1 | 6/2011 | Murthy et al. |
| 2012/0151355 A1 | 6/2012 | Butt et al. |
| 2013/0262681 A1 | 10/2013 | Guo |
| 2013/0297770 A1 | 11/2013 | Zhang |
| 2014/0047099 A1 | 2/2014 | Flores et al. |
| 2014/0328214 A1 | 11/2014 | Iovanna et al. |
| 2018/0278495 A1 | 9/2018 | Di Cairano |

FOREIGN PATENT DOCUMENTS

| | | |
|---|---|---|
| WO | WO-2010/019458 | 2/2010 |
| WO | WO 2014/048477 | 4/2014 |
| WO | WO-2017/117487 | 7/2017 |

OTHER PUBLICATIONS

Written Opinion of the International Searching Authority for corresponding International Application No. PCT/EP2015/079250 dated Feb. 12, 2016; 6 pages.

International Preliminary Report on Patentability for corresponding International Application No. PCT/EP2015/079250 dated Mar. 17, 2017; 17 pages.

Mathis et al., "The macroscopic behavior of the TCP congestion avoidance algorithm," Computer Communication Review (Jul. 1997) vol. 27, No. 3; 67-82.

Application and Filing Receipt for U.S. Appl. No. 15/537,719, filed Jun. 19, 2017, Inventors: Di Cairano-Gilfedder et al.

Van De Meent, "Network Link Dimensioning a measurement & modeling based approach", URL: http://core.ac.uk/download/pdf/11461024.pdf, Mar. 24, 2006, 210 pages.

Van De Meent et al., "Burstiness Predictions based on rough network traffic measurements", URL: https://research.utwente.nl/files/5507436/Meent_WTC_Burstiness.pdf, Sep. 12, 2004, 6 pages.

De Oliveira Schmidt, Ricardo, "Measurement-Based Link Dimensioning for the Future Internet", Enschede: University of Twente, NL, XP055400849, ISSN: 2278-4802, ISSN: 978-90-365-3798-8, DOI: 10.3990/1.9789036537988 vol. 4, pp. 1-180, Nov. 26, 2014.

Extended European Search Report, Application No. 17160488.7, dated Sep. 14, 2017, 10 pages.

Search and Examination Report, Application No. GB1703942.1, dated Aug. 24, 2017, 9 pages.

International Search Report and Written Opinion, Application No. PCT/EP2018/053348, Date of Completion of Search Report May 7, 2018, 17 pages.

Van De Meent, "Smart Dimensioning of IP Network Links", University of Twente, NL, A. Clemm, L.Z. Granville, and R. Stadler (Eds.): DSOM Oct. 2007, LNCS 4785, pp. 86-97.

TELECOMMUNICATIONS NETWORK

CROSS-REFERENCE TO RELATED APPLICATION

The present application is a National Phase entry of PCT Application No. PCT/EP2018/053348, filed Feb. 9, 2018, which claims priority from European Patent Application No. 17160488.7 filed Mar. 13, 2017, each of which is fully incorporated herein by reference.

TECHNICAL FIELD

The present disclosure relates to a method of dimensioning a link in a telecommunications network.

BACKGROUND

Telecommunications networks include a plurality of network nodes connected by links (such as optical fiber connections). When planning or modifying a network, the Network Operator must estimate the capacity of a link between two network nodes (typically known as "dimensioning") to accommodate the expected traffic on that link. This is particularly important when the Network Operator must meet certain Service Level Agreement (SLA) targets.

In most networking scenarios, a link carries data for a plurality of users and there is usually a direct relationship between the number of users for which a link carries traffic for and the smoothness of a traffic profile for the link. That is, as the number of users of a link increases, the traffic profile for that link is relatively smooth. Accordingly, links between core networking nodes have relatively smooth traffic profiles compared to links between edge networking nodes or those in enterprise networks. In this sense, a relatively smooth traffic profile is one having fewer and/or less pronounced spikes from a mean traffic rate (in which other variables, such as time of day, remain constant).

Network Operators may operate links at high utilizations (e.g. average traffic at 80% or more of the link capacity) when it is known the traffic is relatively smooth. Nonetheless, Operators typically upgrade links when their utilization reaches certain thresholds, such as 40-50% of link capacity. However, when the traffic profile is less smooth due to the presence of traffic bursts (that is, in which the instantaneous traffic produces one or more pronounced spikes above the mean traffic rate) then a highly utilized link may suddenly be overwhelmed. This may result in packets being queued at network nodes associated with the link, resulting in packet delays, discards and jitter. Such performance degradation may even be realized on links which are operating at a very low utilization if, for example, a traffic burst is sufficiently demanding and/or the link utilization measurements of peak and mean traffic rates are taken over coarse timescales.

A well-known practice for link dimensioning is to multiply the mean traffic rate by a "peak-to-mean" factor to estimate the capacity of a link. Typically, Network Operators use a value of 30 for the peak-to-mean factor to accommodate the expected traffic on a link and meet the SLA requirements. However, in some scenarios, this value is overly generous and results in greater than necessary costs for building a network to satisfy the SLA requirements (as higher-capacity links tend to cost more than lower-capacity links).

SUMMARY

It is therefore desirable to alleviate some or all of the above problems.

According to a first aspect of the disclosure, there is provided a method of dimensioning a link in a telecommunications network, the method comprising: determining, for a first plurality of sets of traffic observations, wherein each set of the first plurality of sets includes a series of traffic observations each indicating the amount of traffic on a link within an observation interval of a particular duration for that set, a peak value of a traffic observation of the series of traffic observations within each set of the first plurality of sets and an average value of the series of traffic observations within each set of the first plurality of sets; calculating a first peak to average ratio for each observation interval duration based on the determined peak and average values within each set of the first plurality of sets; determining a goodness of fit value for a power function of the first peak to average ratio against its respective observation interval duration; selecting a dimensioning interval duration based on the determined goodness of fit value; and estimating a capacity of the link based on the selected dimensioning interval duration.

According to a second aspect of the disclosure, there is provided a computer program comprising instructions which, when the program is executed by a computer, cause the computer to carry out the method of the first aspect of the disclosure. The computer program may be stored on a computer readable data carrier.

According to a third aspect of the disclosure, there is provided a device having a processor for performing the method of the first aspect of the disclosure.

Selecting the dimensioning interval duration may be based on the goodness of fit value and a service level requirement.

The first plurality of sets of traffic observations are within a first time period, and the method may further comprise: determining, for a second plurality of sets of traffic observations within a second time period, wherein each set of the second plurality of sets includes a series of traffic observations each indicating the amount of traffic on the link within an observation interval of a particular duration for that set, a peak value of a traffic observation of the series of traffic observations within each set of the second plurality of sets and an average value of the series of traffic observations within each set of the second plurality of sets, wherein the observation interval durations for each set of the first plurality of sets of traffic observations are equal to the observation interval durations for each set of the second plurality of sets of traffic observations.

The method may further comprise calculating a second peak to average ratio for each observation interval duration based on the determined peak and average values within each set of the second plurality of sets, wherein the power function may be of either the first or second peak to average ratio against its respective observation interval duration.

The power function may be of the maximum of either the first or second peak to average ratio against its respective observation interval duration.

The method may further comprise the step of: determining a peak-utilization period for the link, wherein the first and second time periods are within the peak-utilization period.

The method may further comprise: determining first and second overall traffic observations for the first and second time period, respectively, wherein the first and second overall traffic observations indicate the amount of traffic on the link in the first and second time periods, respectively; and filtering the series of traffic observations of the first and second plurality of sets of any traffic observation that satisfies a criterion based on the first and second overall traffic observations, respectively.

One of the series of observations of a first set of the first and/or second plurality of sets may occur at the same time instance as one of the series of observations of a second set of the first and/or second plurality of sets.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

A first embodiment of a telecommunications network 1 of the present disclosure will now be described with reference to FIGS. 1 to 3. The telecommunications network 1 includes a plurality of network nodes, including a plurality of Customer Premises Equipment (CPE) 10a . . . 10h, a first and second Digital Subscriber Line Access Multiplexer (DSLAM) 20, 30, an access network gateway router 40 and a core network router 50. The first and second DSLAMS 20, 30, access network gateway router 40 and core network router 50 are each connected to a respective Network Management System (NMS) 60a, 60b, 60c, 60d.

Figure 1:
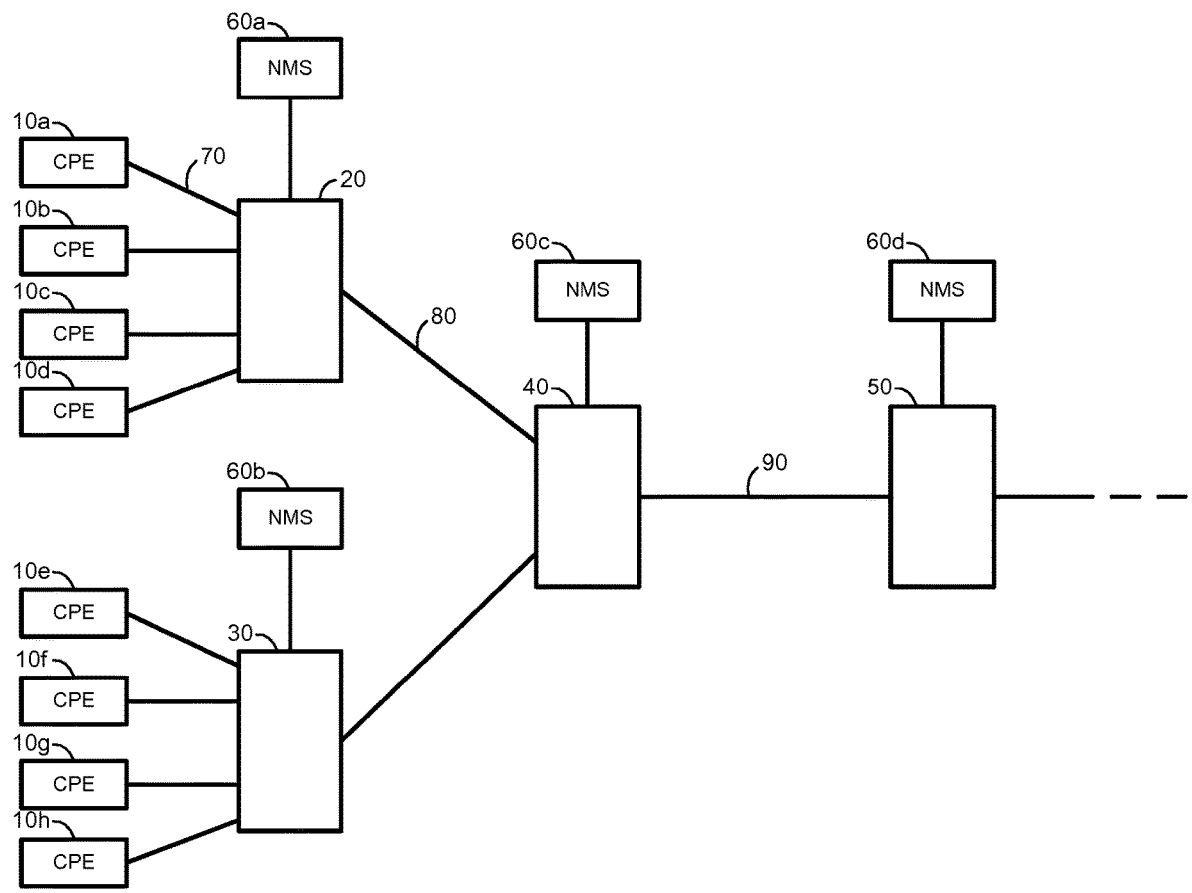
FIG. 1 is a schematic diagram of an embodiment of a telecommunications network of the present disclosure.

FIG. 1 also illustrates a plurality of links, including a first link 70 between a first CPE 10a and the first DSLAM 20, a second link 80 between the first DSLAM 20 and the access network gateway router 40, and a third link 90 between the access network gateway router 40 and the core network router 50. The first link 70 carries traffic between the first CPE 10a and the first DSLAM 20 only. The first DSLAM 20 multiplexes this traffic with any traffic associated with the respective links with the second, third and fourth CPEs 10b, 10c, 10d, which is thereafter carried on the second link 80 to the access network gateway router 40. The access network gateway router 40 multiplexes this traffic with any traffic associated with the respective link with the second DSLAM 30 (and therefore the fifth, sixth, seventh and eighth CPE 10e, 10f, 10g, 10h), which is thereafter carried on the third link 90 to the core network router 50. This process is often known as "link aggregation". Accordingly, the third link 90 requires more capacity than the second link 80, and the second link 80 requires more capacity than the first link 70.

Figure 2:
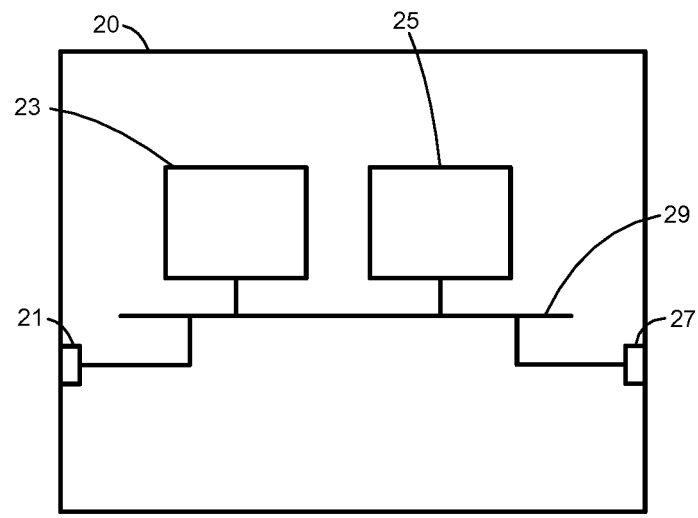
FIG. 2 is a schematic diagram of a Digital Subscriber Line Access Multiplexer (DSLAM) of FIG. 1.

The first DSLAM 20 is shown in more detail in FIG. 2. The first DSLAM 20 includes a first transceiver 21, a processor 23, memory 25, and a second transceiver 27, all connected via bus 29. The first transceiver 21 is an optical fiber interface for a downstream connection to the first, second, third and fourth CPEs 10a, 10b, 10c, 10d (wherein the connection to the first CPE 10a is via the first link 70). The second transceiver 27 is also an optical fiber interface for an upstream connection to the access network gateway router 40 via the second link 80, and a connection to the NMS 60a. The processor 23 includes a packet counting function which is adapted to count the number of packets transmitted to any one of the CPEs 10a, 10b, 10c, 10d via the first transceiver 21 or to the access network gateway router 40 via the second transceiver 27. In this embodiment, the packet counting function is implemented using traffic sniffing software, Wireshark®, provided by Wireshark Foundation.

In one particular use of the packet counting function, the processor 23 is configured to count the number of packets in five and fifteen minute time periods transmitted over the first link 70 to the first CPE 10a, and store a value for the average (mean) data rate in these five and fifteen minute periods in memory 25. The processor 23 is also configured to count the number of packets in five and fifteen minute time periods transmitted over the second link 80 to the access network gateway router 40, and store a value for the average data rate in these five and fifteen minute periods in memory 25. Memory 25 stores a plurality of these values for these five and fifteen minute average data rates in a Management Information Base (MIB), including the most recent and a plurality of historical values (up to, for example, a day's worth). The first DSLAM 20 is configured to report these values for the five and fifteen minute average data rates for the first and second links 70, 80 to the NMS 60a (either periodically or in response to a request).

In this embodiment, the plurality of CPEs 10a . . . 10h, the second DSLAM 30, the access network gateway router 40 and the core network router 50 also contain first and second transceivers, processors and memory, wherein the processors contain packet counting functions for counting the number of packets transmitted via the first and/or second transceivers.

Figure 3:
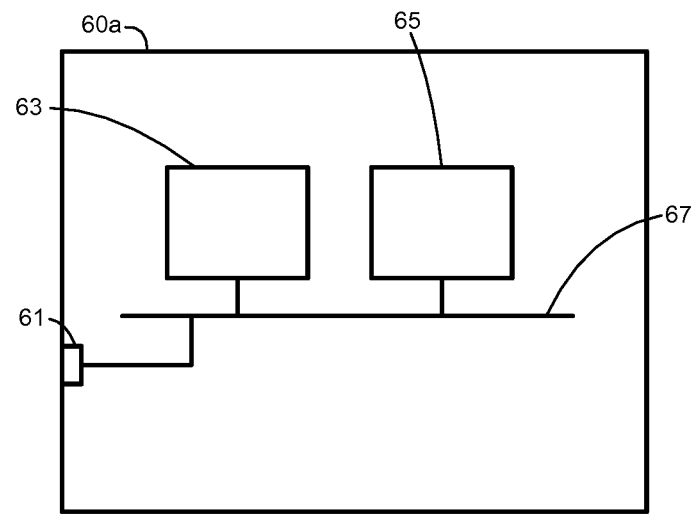
FIG. 3 is a schematic diagram of a Network Management System (NMS) of FIG. 1.

The NMS 60a is shown in more detail in FIG. 3. The NMS 60a includes a first transceiver 61, a processor 63 and memory 65, all connected via bus 67. The first transceiver 61 is an optical fiber interface for connecting the NMS 60a to the first DSLAM 20. Memory 65 is configured to store a plurality of values of the five and fifteen minute average data rates (that is, the most recent values and the historical values) for the first and second links 70, 80.

In this embodiment, the NMSs associated with the second DSLAM 30, the access network gateway router 40 and the core network router 50 are substantially the same. However, the skilled person will understand that it is possible for a single NMS to be associated with multiple nodes in the network.

Figure 4:
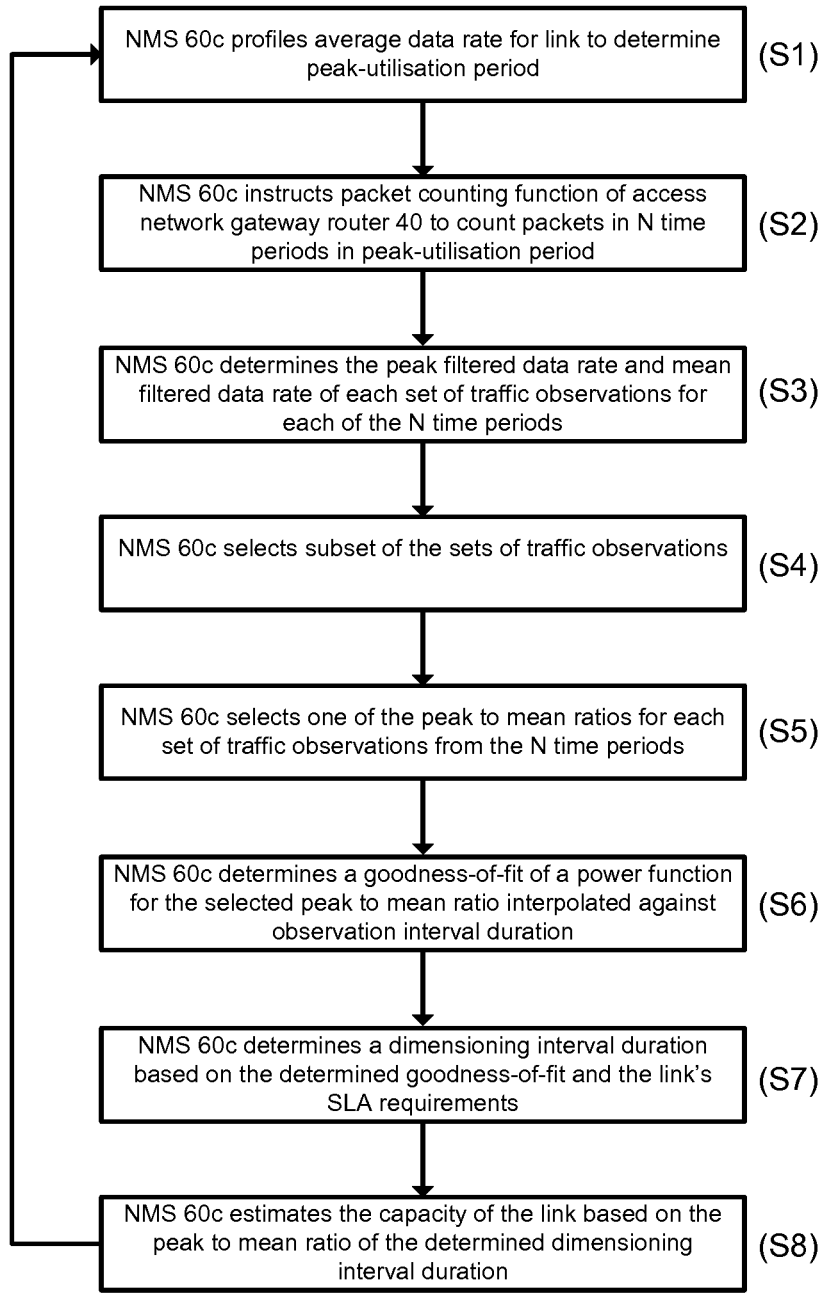
FIG. 4 is a flow diagram of an embodiment of a method of the present disclosure.

An embodiment of a method of the present disclosure will now be described with reference to FIGS. 4 to 6. This embodiment relates to the dimensioning of the second link 80 (between the first DSLAM 20 and the access network gateway router 40) in an operational network, such that the Network Operator is re-provisioning (or upgrading) the second link 80.

At S1, NMS 60c retrieves the plurality of values of the five and fifteen minute average data rates (stored in memory 65) to profile the average data rate over the day and determine a peak-utilization period for the second link 80 (e.g. the hour in the day having the greatest average data rate). The NMS 60c then identifies N disjoint time periods within the peak-utilization period, and obtains average data rates for these N time periods. In this embodiment, these N time periods and their average data rates are three of the five minute average data rates for the second link 80 separated by fifteen minutes within the peak-utilization period.

In S2, NMS 60c instructs the packet counting function of the processor of the access network gateway router 40 to count the number of packets transmitted over the second link 80 to obtain a series of traffic measurements within each of the N time-periods. In this embodiment, the access network gateway router 40 counts the number of packets transmitted within successive observation intervals of a particular duration (such as, for example, a millisecond), such that it obtains a count of packets in the first millisecond, a count of packets in the second millisecond, and so on, for the entirety of each of the N time-periods. This first set of traffic observations is stored in memory.

The access network gateway router 40 reports the first set of traffic observations (each indicating the count of packets within successive observation intervals of a particular duration) to the NMS 60c, which are stored in memory 65. The processor 63 is then able to evaluate further sets of traffic observations for the N time periods, wherein each set indicates a count of packets transmitted within successive observations intervals, wherein the observation interval duration for each set is different. For example, a second, third, fourth and fifth set of traffic observations relate to observation interval durations of ten milliseconds, fifty milliseconds, one-hundred milliseconds, and one-second respectively, and may be evaluated by summing the corresponding counts from the first set of traffic observations indicating the count of packets within successive one-millisecond observation intervals. Thus, the second set of traffic observations indicating the count of packets in successive ten-millisecond intervals may be evaluated by summing the counts of packets in the traffic observations for the first to the tenth one-millisecond observation intervals, the counts of packets in the traffic observations for the eleventh to the twentieth one-millisecond observation intervals, and so on. This processing is performed to evaluate a plurality of sets of traffic observations (each set relating to a different observation interval duration) for each of the three time periods to create a first, second and third plurality of sets of traffic observations.

Accordingly, once this processing is complete, the NMS 60a stores a first plurality of sets of traffic observations, including the first, second, third, fourth and fifth sets of traffic observations for the first time period (that is, the first set of traffic observations indicating the count of packets at a first observation interval duration in the first time period, the second set of traffic observations indicating the count of packets at a second observation interval duration in the first time period, and so on), a second plurality of sets of traffic observations, including the first, second, third, fourth and fifth sets of traffic observations for the second time period (that is, the first set of traffic observations indicating the count of packets at the first observation interval duration in the second time period, the second set of traffic observations indicating the count of packets at the second observation interval duration in the second time period, and so on), and a third plurality of sets of traffic observations, including the first, second, third, fourth and fifth sets of traffic observations for the third time period (that is, the first set of traffic observations indicating the count of packets at the first observation interval duration in the third time period, the second set of traffic observations indicating the count of packets at the second observation interval duration in the third time period, and so on).

Figure 5:
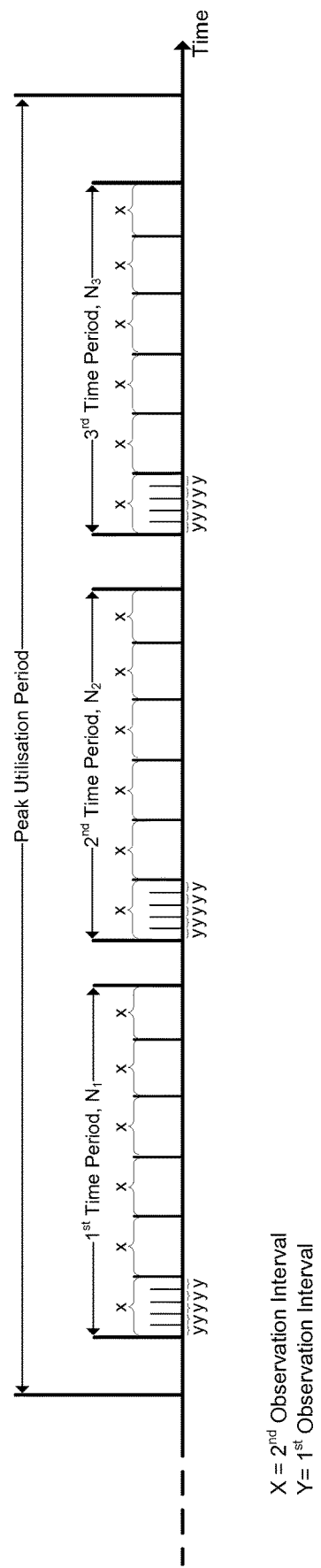
FIG. 5 is a diagram illustrating a peak-utilization hour of a link of FIG. 1.
Figure 6:
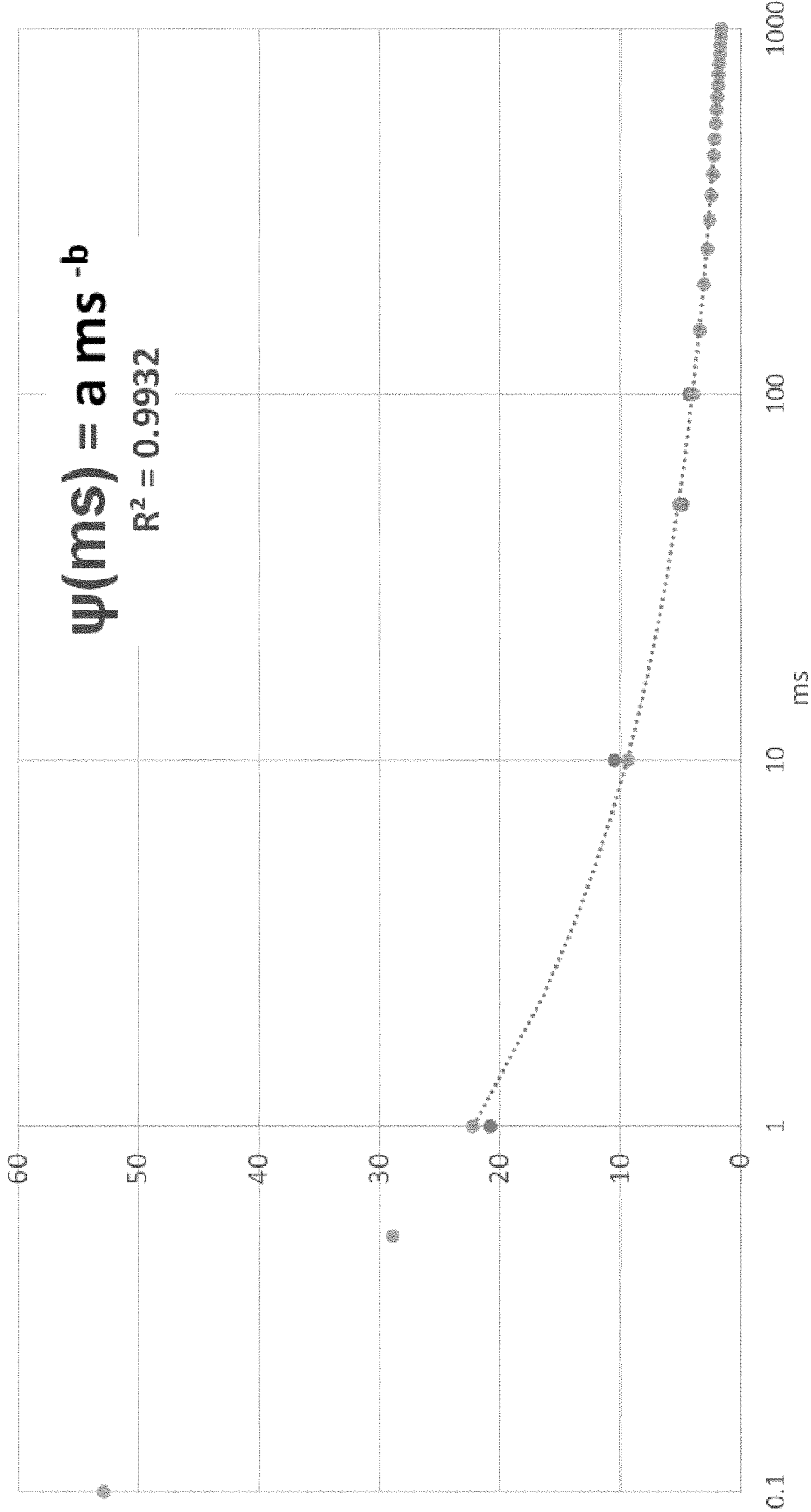
FIG. 6 is a graph illustrating several peak-to-mean ratios against observation interval of the link of FIG. 1.

For completeness, the concept and relationships between the peak-utilization period, the disjoint time periods, and the first, second and third plurality of sets of traffic observations of differing interval durations are illustrated in FIG. 5.

Firstly, it is noted that the term "time period" represents elapsed time having a defined start and end point, and the term "interval" represents elapsed time between any start and end point. In FIG. 5, the horizontal axis represents time, and the diagram focuses on a peak-utilization time period. FIG. 5 also illustrates the $1^{st}$, $2^{nd}$ and $3^{rd}$ disjoint time periods, $N_1$, $N_2$, $N_3$, which have defined start and end points and are non-overlapping. As noted above, the access network gateway router 40 counts the number of packets transmitted within successive observation intervals within the whole of each of the N time periods. As shown in FIG. 5, these traffic observations relate to the number of packets that are transmitted in an observation interval (of duration 'y'), and these are counted in successive observation intervals for the whole of each of the N time periods (although only the first five observation intervals of each of the N time periods are shown in FIG. 5). This data, indicating each successive traffic observation (of length 'y') and the count of packets in each traffic observation, is then reported to the NMS 60c as the first set of traffic observations.

The NMS 60c then evaluates a second set of traffic observations, wherein the second set of traffic observations uses observation interval duration 'x', within the whole of each of the N time periods. This is achieved by summing the counts of packets from the first set of traffic observations of observation interval duration 'y'. For example, the first traffic observation of the second set (of duration 'x') is the sum of all of the first five traffic observations of the first set (of duration 'y'). Although FIG. 5 is not to scale and only shows two sets of traffic observations, it will now be clear how these concepts may be extended when each time period is subdivided into any number of sets of particular observation interval durations.

In an example, the NMS 60c has the following data:

TABLE 1

Table illustrating a count of packets within a first, second and third sets of traffic observations, stored in memory 65

| Time Period (N) | First Set of Traffic Observations (Interval Duration: 1 ms) | | Second Set of Traffic Observations (Interval Duration: 10 ms) | | Third Set of Traffic Observations (Interval Duration: 50 ms) | | |
|---|---|---|---|---|---|---|---|
| | Interval (ms) | Count of Packets | Interval (ms) | Count of Packets | Interval (ms) | Count of Packets | |
| $N_1$ | 0->1 | 58 | 0->10 | 475 | 0->50 | 2541 | ... |
| | 1->2 | 69 | 10->20 | 577 | 50->100 | 2307 | ... |
| | 2->3 | 0 | 20->30 | 496 | 100->150 | 2466 | ... |
| | 3->4 | 60 | 30->40 | 479 | 150->200 | 2137 | ... |
| | 4->5 | 82 | 40->50 | 514 | 200->250 | 2412 | ... |
| | ... | ... | ... | ... | ... | ... | ... |
| $N_2$ | 0->1 | 1 | 0->10 | 437 | 0->50 | 2434 | ... |
| | 1->2 | 67 | 10->20 | 461 | 50->100 | 2793 | ... |
| | 2->3 | 75 | 20->30 | 472 | 100->150 | 2578 | ... |
| | 3->4 | 46 | 30->40 | 479 | 150->200 | 2563 | ... |
| | 4->5 | 17 | 40->50 | 458 | 200->250 | 2636 | ... |
| | ... | ... | ... | ... | ... | ... | ... |
| $N_3$ | ... | ... | ... | ... | ... | ... | ... |

The NMS 60c may then translate these packet count values into data rates by multiplying the packet count by the packet size, and dividing by the respective observation interval duration. For example, the data rate for 40→50 ms of the second set in the first time period, $N_1$, would be (514 packets*12000 bits/packet)/10 ms, which equals 616800000 bits/s (or 616.8 Mb/s).

In this embodiment, NMS 60c is configured to filter these results in order to remove any result which is not within a threshold of the five minute average data rate of the relevant time period (determined in step S1). This is achieved by setting a threshold parameter, δ, and filtering any result which is not within the five minute average data rate (for the relevant time period) plus or minus δ. For example, if δ is 0.01 and the five minute average data rate is 615 MB/s, then any result which is not within 615*0.99=608.85 and 615*1.01=621.15 is filtered out. This has the benefit of removing any outliers from the results.

In S3, the NMS 60c determines the peak filtered data rate of each set of traffic observations for each of the N time periods, and the mean filtered data rate within each set of traffic observations for each of the N time periods. In S4, the NMS 60c selects a subset of the sets of traffic observations, being those which have a mean filtered data rate being substantially the same (e.g. wherein the mean filtered data rate for each of the subset of set of traffic observations is within a threshold, δ). In this example, the NMS 60c selects the first, second, fourth and fifth sets of traffic observations (that is, having the one-millisecond, the ten millisecond, the one-hundred millisecond and the one-second observation interval durations). Again, this has the benefit of removing outlier results from subsequent processing.

The NMS 60c then determines a peak to mean ratio for each observation interval duration. This determination is made in two parts. Firstly, the NMS 60c calculates a peak to mean ratio for each of the subset of the sets of traffic observations for each time period, based on the peak filtered data rate and mean filtered data rate for each set of traffic observations. This data is illustrated in the following table:

TABLE 2

Table illustrating the peak to mean ratios calculated for each set of traffic observations for each time period

| Time Period (N) | First Set of Traffic Observations (Interval Duration: 1 ms) | Second Set of Traffic Observations (Interval Duration: 10 ms) | Fourth Set of Traffic Observations (Interval Duration: 100 ms) | ... |
|---|---|---|---|---|
| $N_1$ | Ψ(1 ms, N1) | Ψ(10 ms, N1) | Ψ(100 ms, N1) | ... |
| $N_2$ | Ψ(1 ms, N2) | Ψ(10 ms, N2) | Ψ(100 ms, N2) | ... |
| $N_3$ | Ψ(1 ms, N3) | Ψ(10 ms, N3) | Ψ(100 ms, N3) | ... |

In S5, the NMS 60c selects one of the peak to mean ratios for each set of traffic observations from the three time periods (e.g. one of Ψ(1 ms,N1), Ψ(1 ms,N2) or Ψ(1 ms,N3) for the first set of traffic observations). In this embodiment, the NMS 60c selects the maximum peak to mean ratio for each set of traffic observations across the three time periods (for example, the selected peak to mean ratio for the first series Ψ(1 ms) is the maximum of Ψ(1 ms,N1), Ψ(1 ms,N2) and Ψ(1 ms,N3)). This maximum value is then the selected peak to mean ratio for the corresponding observation interval duration.

A theoretical discussion of the concepts behind the remaining steps will now be presented. In testing scenarios, the present inventors evaluated the selected peak to mean ratios for each observation interval duration by interpolating them against observation interval duration according to a power function (of format $\Psi = a \ast x^{-b}$, where Ψ is the selected peak to mean ratio, x is the corresponding observation interval duration (e.g. 1 ms, 10 ms, 100 ms or 1 s), and a and b are constants). An example graph illustrating this data for one testing scenario is illustrated in FIG. 6.

The present inventors further discovered, by performing such interpolations for a plurality of test links, that the goodness of fit of the power curve is indicative of the burstiness of traffic in each link. That is, for relatively bursty traffic (or in other words, less smooth traffic), the goodness of fit of a power function is relatively high, whereas for relatively smooth traffic (or in other words, less bursty traffic), the goodness of fit of a power function is relatively low. The method of interpolating data according to a power function and of determining a goodness of fit (such as the R-squared method) will be apparent to a person skilled in the art.

Accordingly, in S6, the NMS 60c determines a goodness of fit value of a power function for the selected peak to mean ratios interpolated against observation interval duration. This value, hereinafter the "Degree of Burstiness" or "DB", is stored in memory 65, together with a timestamp, to indicate the burstiness of traffic of the second link 80 at that time.

In S7, the NMS 60c determines a dimensioning interval duration (being one of observation interval durations of the first, second, fourth and fifth sets, e.g. 1 ms, 10 ms, 100 ms, 1 s), based on predetermined fuzzy logic rules. In this embodiment, these rules are:

1. If DB is relatively high (e.g. greater than a first DB threshold), and the link's SLA requirements are stringent (e.g. satisfying one or more Operator defined thresholds), then a relatively short time duration is selected as the dimensioning interval duration, e.g. 1 ms;
2. If DB is relatively high (e.g. greater than the first DB threshold), and the link's SLA requirements are not stringent (based on the Operator defined thresholds), then a medium time duration is selected as the dimensioning interval duration, e.g. 10 ms or 100 ms;
3. If DB is relatively low (e.g. less than the first DB threshold), and the link's SLA requirements are stringent (e.g. satisfying one or more Operator defined thresholds), then a medium time duration is selected as the dimensioning interval duration, e.g. 10 ms or 100 ms.
4. If DB is relatively low (e.g. less than the first DB threshold), and the link's SLA requirements are not stringent (based on the Operator defined thresholds), then a relatively long time duration is selected as the dimensioning interval duration, e.g. 1 s.

In an example, the first DB threshold may be 0.8, and the Operator defined SLA threshold may be that delay is less than 50 ms for a link to have 'stringent' SLA requirements. However, the skilled person will understand that such thresholds may be tailored depending on the services provided by the link or by trailing test scenarios.

In S8, the NMS 60c estimates the capacity of the link by multiplying the selected peak to mean ratio (selected in S5) associated with the dimensioning interval duration (identified in S7) by the second link's average data rate. In this embodiment, the average data rate is that of the five minute time period associated with the selected peak to mean ratio. According to this process, any link which has relatively bursty traffic will be provisioned based on a peak to mean ratio associated with a relatively short dimensioning interval duration (compared to links with relatively smooth traffic). The peak to mean ratios for these shorter dimensioning interval durations are more sensitive to traffic bursts and are therefore greater than the peak to mean ratios for longer dimensioning interval durations. Accordingly, the NMS 60c will estimate greater capacities for links with relatively bursty traffic. Furthermore, as the burstiness of the traffic is being determined objectively by measurements on the link, the capacity of the link is proportional to its burstiness (based on the use of appropriate Operator-defined threshold), such that the link will not be over-provisioned or under-provisioned for its scenario.

The value for the estimated capacity is stored in memory 65 together with a timestamp. The Network Operator may therefore query the NMS 60c to determine the value for the estimated capacity. The Operator may then upgrade (or downgrade) the link to one having a capacity substantially equal to the estimated capacity. The actual capacity may be slightly greater than the estimate for resilience and predicted traffic growth purposes.

In this embodiment, the process loops back to S1 (via a delay timer) and a new estimate of the capacity of the link is determined based on updated traffic measurements. In this manner, the Network Operator may query the NMS 60c to determine the most recent value for the estimated capacity.

The skilled person will understand that the number of time periods, and the number of sets of traffic observations in each time period, in the above embodiment are merely examples. However, a plurality of time periods are used in order to evaluate more data points across the peak-utilization period. Furthermore, five sets of traffic observations are used in order to evaluate a power function for peak-to-mean ratio against observation interval duration, although fewer sets (and therefore fewer observation interval durations) may be used to interpolate a power function.

Furthermore, the peak-to-mean ratio for each observation interval duration is selected as the maximum of the peak-to-mean ratio for each set for each time period. The skilled person will understand that this is non-essential, and any of the peak-to-mean ratios for each set may be chosen. However, the maximum of these ratios will subsequently estimate a greater capacity for the link and is therefore a more conservative value.

The skilled person will also understand that it is non-essential that the data rate results are filtered of those that are not within a threshold, and that a subset of the sets of traffic observations are used. However, this has the benefit of removing outliers from [[the]] subsequent processing.

In the above embodiments, the packet counting function is implemented using Wireshark, but the skilled person will understand that other software may be used, such as GFI LanGuard, Microsoft Network Monitor, Nagios, OpenNMS, Advanced IP Scanner, Capda Free, Fiddler, NetworkMiner, Pandora FMS, Zenoss Core, PRTG Network Monitor Freeware, The Dude, Splunk, Angry IP Scanner, Icinga 2, Total Network Monitor, NetXMS, and WirelessNetView.

In the above embodiments, the packet counting function observes the traffic on a link and reports this data to an NMS, and the NMS derives further observations based on this data. However, the skilled person will understand that this is not the only way of implementing the present disclosure. For example, the packet counting function may perform observations of the traffic on the link for a plurality of observation intervals, which are thereafter reported to the NMS.

The skilled person will understand that any combination of features is possible within the scope of the disclosure, as claimed.

The invention claimed is:

1. A method of dimensioning a link in a telecommunications network, the method comprising:
   determining, for a first set of traffic observations, wherein the first set includes a first series of traffic observations each indicating an amount of traffic on a link within an observation interval of a first duration, a peak value of a traffic observation of the first series of traffic observations and an average value of the first series of traffic observations;
   calculating a first peak to average ratio for the first set of traffic observations based on the determined peak and average values for the first set of traffic observations;
   determining, for a second set of traffic observations, wherein the second set includes a second series of traffic observations each indicating an amount of traffic on the link within an observation interval of a second duration different from the first duration, a peak value of a traffic observation of the second series of traffic observations and an average value of the second series of traffic observations;
   calculating a second peak to average ratio for the second set of traffic observations based on the determined peak and average values for the second set of traffic observations;
   determining a goodness of fit value for a power function of the first and second peak to average ratios against the first and second durations;
   selecting a dimensioning interval duration based on the determined goodness of fit value; and
   estimating a capacity of the link based on the selected dimensioning interval duration.

2. The method as claimed in claim 1, wherein selecting the dimensioning interval duration is based on the goodness of fit value and a service level requirement.

3. The method as claimed in claim 1, wherein the first and second sets of traffic observations are within a first time period, and the method further comprises:
   determining, for a third set of traffic observations within a second time period, wherein the third set includes a third series of traffic observations each indicating an amount of traffic on the link within an observation interval of a third duration, a peak value of a traffic observation of the third series of traffic observations and an average value of the third series of traffic observations; and
   determining, for a fourth set of traffic observations, wherein the fourth set includes a fourth series of traffic observations each indicating an amount of traffic on the link within an observation interval of the second duration, a peak value of a traffic observation of the second series of traffic observations and an average value of the second series of traffic observations.

4. The method as claimed in claim 3, further comprising:
   calculating a third peak to average ratio for the third set of traffic observations based on the determined peak value and average values for the third set of traffic observations; and
   calculating a fourth peak to average ratio for the fourth set of traffic observations based on the determined peak and average values for the fourth set of traffic observations, wherein the power function is of one of the first or second peak to average ratio and one of the third or fourth peak to average ratio against the first and second durations.

5. The method as claimed in claim 4, wherein the power function is of a maximum of the first and second peak to average ratio and the maximum of the third and fourth peak to average ratio against the first and second durations.

6. The method as claimed in claim 3, further comprising:
   determining a peak-utilization period for the link, wherein the first time period and the second time period are within the peak-utilization period.

7. The method as claimed in claim 3, further comprising:
determining first overall traffic observations and second overall traffic observations for the first time period and the second time period, respectively, wherein the first overall traffic observations and the second overall traffic observations indicate an amount of traffic on the link in the first and second time periods respectively; and
filtering the first, second, third and fourth series of traffic observations of any traffic observation that satisfies a criterion based on the first overall traffic observations and the second overall traffic observations, respectively.

8. The method as claimed in claim 1, wherein one of the first or second series of observations occurs at a same time instance as one of the third or fourth series of observations.

9. A non-transitory computer-readable storage medium storing a computer program comprising instructions which, when the computer program is executed by a computer, cause the computer to carry out the method of claim 1.

10. A device for dimensioning a link in a telecommunications network, the device comprising:
a processor and memory adapted to:
determine, for a first set of traffic observations, wherein the first set includes a first series of traffic observations each indicating an amount of traffic on a link within an observation interval of a first duration, a peak value of a traffic observation of the first series of traffic observations and an average value of the first series of traffic observations;
calculate a first peak to average ratio for the first set of traffic observations based on the determined peak and average values for the first set of traffic observations;
determine, for a second set of traffic observations, wherein the second set includes a second series of traffic observations each indicating an amount of traffic on the link within an observation interval of a second duration different from the first duration, a peak value of a traffic observation of the second series of traffic observations and an average value of the second series of traffic observations;
calculate a second peak to average ratio for the second set of traffic observations based on the determined peak and average values for the second set of traffic observations;
determine a goodness of fit value for a power function of the first and second peak to average ratios against the first and second durations;
select a dimensioning interval duration based on the determined goodness of fit value; and
estimate a capacity of the link based on the selected dimensioning interval duration.

* * * * *